(12) United States Patent
Huang et al.

(10) Patent No.: US 6,170,987 B1
(45) Date of Patent: Jan. 9, 2001

(54) PRELOADING BEARING UNIT

(75) Inventors: Chun-Hung Huang, Hsinchu; Yung-Hsian Lai, Taichung, both of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/391,532

(22) Filed: Sep. 8, 1999

(51) Int. Cl.$^7$ ...................................................... F16C 19/08
(52) U.S. Cl. ............................................. 384/99; 384/517
(58) Field of Search ............................... 384/99, 517, 563, 384/556

(56) References Cited

U.S. PATENT DOCUMENTS

| | | | |
|---|---|---|---|
| 5,743,016 | * 4/1998 | Manne et al. | 384/563 |
| 6,015,264 | * 1/2000 | Violette et al. | 384/517 |

* cited by examiner

Primary Examiner—Lenard A. Footland
(74) Attorney, Agent, or Firm—Rosenberg, Klein & Lee

(57) ABSTRACT

A preloading bearing unit mounted in a casing to support an antifriction bearing and the output shaft of a motor, the preloading bearing unit including a bushing mounted on the antifriction bearing, and a hydraulic cylinder assembly controlled to display the bushing, the hydraulic cylinder assembly including first and second miniature hydraulic cylinders alternatively arranged around the bushing, the first and second miniature hydraulic cylinders each having a spring stopped against the bushing, first and second hydraulic fluid delivery pipes connected to the miniature hydraulic cylinders, first and second accumulation chambers for guiding a hydraulic fluid to the first miniature hydraulic cylinders and the miniature hydraulic cylinders respectively. A difference preloading pressure is given to the bushing by turning on the first miniature hydraulic cylinders, the second miniature hydraulic cylinders, or both the first and second miniature hydraulic cylinders.

7 Claims, 2 Drawing Sheets

PRELOADING BEARING UNIT

BACKGROUND OF THE INVENTION

The present invention relates to a preloading bearing unit for use with spindle means or the like, and more particularly to such a preloading bearing unit that can be conveniently controlled to impart one of three different preloading pressures.

In order to eliminate the occurrence of a clearance in between a spindle (revolving shaft) and an antifriction bearing, a preloading means may be installed. However, regular preloading bearing means are not adjustable. Adjustable preloading means are seen in U.S. Pat. Nos. 5,388,917 and 5,803,619. However, these two designs still have drawbacks as follows:

1. The preloading pressure can only be adjusted between two levels, namely, the low preloading pressure level and the high preloading pressure level.
2. The hydraulic fluid pressure has to be controlled when adjusting the preloading pressure.
3. Because these design commonly use a single annular hydraulic cylinder to achieve preloading pressure control, the moving parts of the preloading device tend to be stuck.

SUMMARY OF THE INVENTION

The present invention has been accomplished to provide a preloading bearing unit, which eliminates the aforesaid drawbacks. According to the present invention, the preloading bearing unit is mounted within a casing to support an antifriction bearing and the motor shaft of a motor in the antifriction bearing inside the casing. The preloading bearing unit comprises a bushing mounted within the casing around the antifriction bearing, and a hydraulic cylinder assembly controlled to displace the bushing axially on the antifriction bearing, the hydraulic cylinder assembly including first miniature hydraulic cylinders and second miniature hydraulic cylinders alternatively arranged around the bushing, the first and second miniature hydraulic cylinders each having a spring respectively stopped at an outside annular flange at the bushing to impart a pressure to the bushing, first hydraulic fluid delivery pipes and second hydraulic fluid delivery pipes respectively connected to the first and second miniature hydraulic cylinders, a first annular hydraulic fluid accumulation chamber communicated with the first hydraulic fluid delivery pipes for guiding a hydraulic fluid to the first miniature hydraulic cylinders, and a second annular hydraulic fluid accumulation chamber communicated with the second hydraulic delivery pipes for guiding a hydraulic fluid to the second miniature hydraulic cylinders. A different preloading pressure is given to the bushing by turning on the first miniature hydraulic cylinders, the second miniature hydraulic cylinders, or both the first and second miniature hydraulic cylinders, without the need of regulating the pressure of the hydraulic fluid. Because the preloading pressure adjustment is achieved by controlling the operation of the first miniature hydraulic cylinders and the second miniature hydraulic cylinders without changing the pressure of the hydraulic fluid, the hydraulic fluid supply system is less complicated. Therefore, the manufacturing cost of the whole system is relatively low. Further, because multiple miniature hydraulic cylinders are installed, the movable parts of the whole system can be smoothly displaced, and will not be stuck easily.

DETAILED DESCRIPTION OF THE PREFERRED EMBODIMENT

Figure 1:
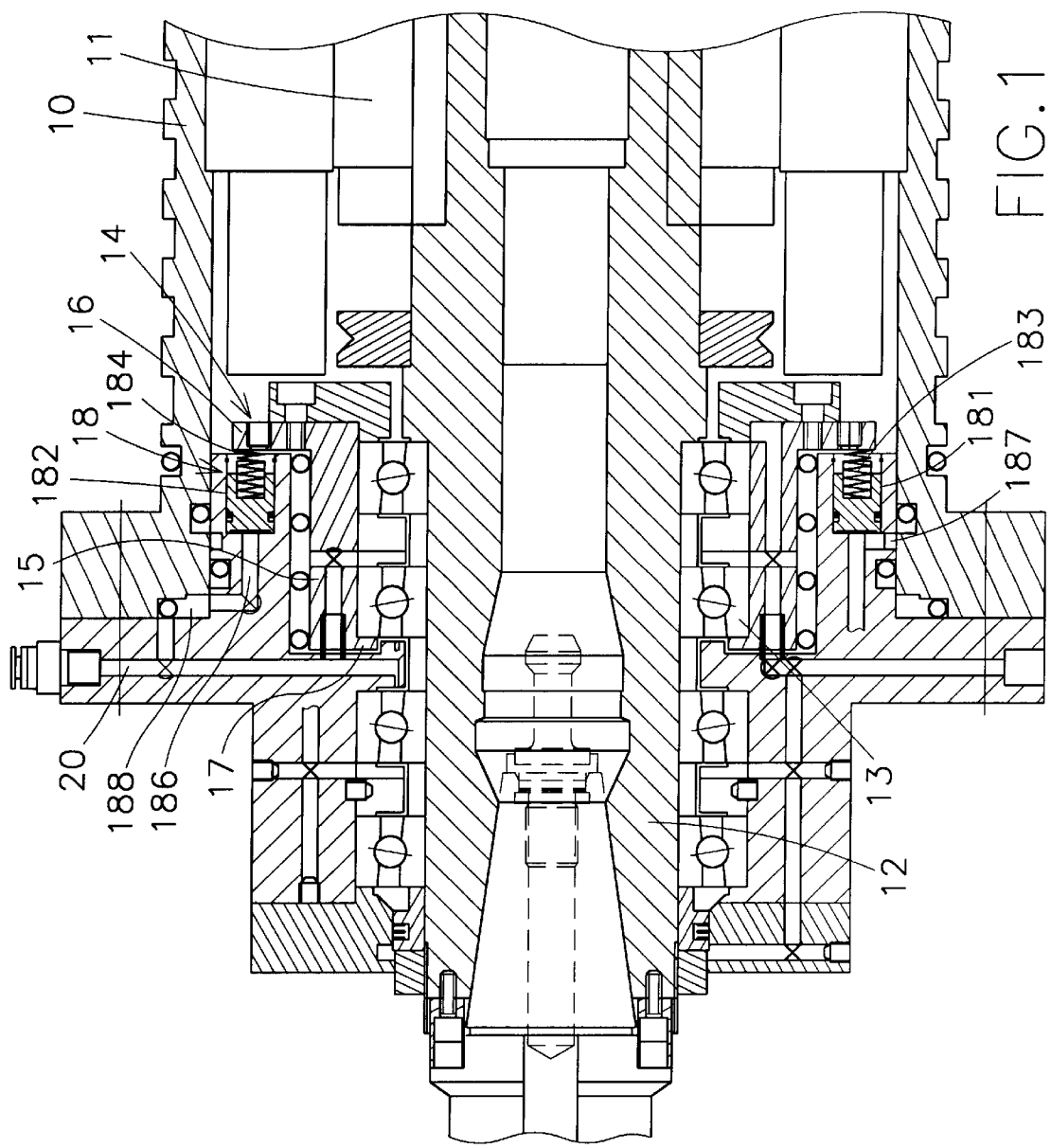
FIG. 1 is a sectional view showing a preloading bearing unit mounted around an antifriction bearing on the motor shaft of a motor inside a casing according to the present invention.
Figure 2:
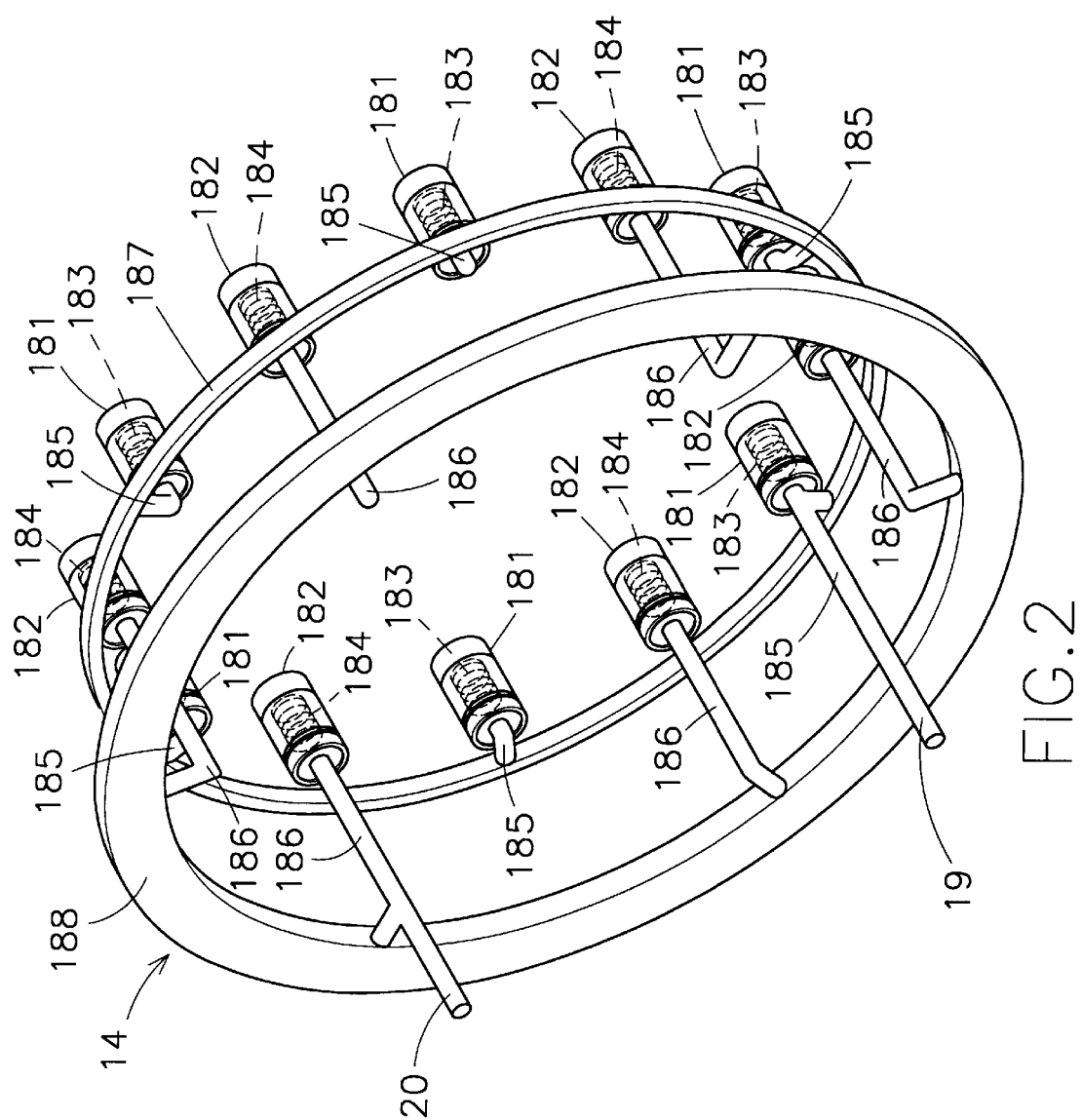
FIG. 2 is a perspective view of the preloading bearing unit according to the present invention.

Referring to FIGS. 1 and 2, a motor 11 is mounted in a casing 10, and driven to rotate a motor shaft 12. Two antifriction bearings 13 are respectively mounted in the casing 10 near front and rear ends of the casing 10. The front and rear ends of the motor shaft 12 are respectively inserted through the bearings 13, and revolvably supported on the bearings 13.

A preloading bearing unit 14 is mounted within the casing 10. The preloading bearing unit 14 comprises a bushing 15 mounted within the casing 10 around the antifriction bearing 13 at one end of the motor shaft 12. The bushing 15 comprises an outside annular flange 16 raised around the outside wall thereof at one end, and an inside annular flange 17 raised around the inside wall thereof at an opposite end. The inside annular flange 17 of the bushing 15 is disposed in contact with the antifriction bearing 13 at one end of the motor shaft 12, such that the bushing 15 is allowed to be moved axially. The bushing 15 can be a ball bushing, or a hydraulic bushing.

The displacement of the bushing 15 is driven by a hydraulic cylinder assembly 18. The hydraulic cylinder assembly 18 is comprised of a plurality of first miniature hydraulic cylinders 181 and second miniature hydraulic cylinders 182 alternatively arranged around the bushing 15. The miniature hydraulic cylinders 181 and 182 each have a rear end mounted with a spring 183 or 184. The springs 183 and 184 of the miniature hydraulic cylinders 181 and 182 are respectively stopped at the outside annular flange 16 of the bushing 15, imparting an initial pressure to the bushing 15. The hydraulic fluid delivery pipes 185 and 186 of the miniature hydraulic cylinders 181 and 182 are arranged in two sets, namely, the first hydraulic fluid delivery pipes 185 and the second hydraulic delivery pipes 186. The first hydraulic fluid delivery pipes 185 are connected to a first annular hydraulic fluid accumulation chamber 187. The second hydraulic fluid delivery pipes 186 are connected to a second annular hydraulic fluid accumulation chamber 188. The first annular hydraulic fluid accumulation chamber 187 is connected to a first intake pipe 19. The second annular hydraulic fluid accumulation chamber 188 is connected to a second intake pipe 20.

When the miniature hydraulic cylinders 181 and 182 do no work, the springs 183 and 184 of the miniature hydraulic cylinders 181 and 182 are stopped against the outside annular flange 16 of the bushing 15, imparting an initial pressure to the bushing 15. This stage is the low preloading stage. When increasing the preloading pressure, the first miniature hydraulic cylinders 181 or second miniature hydraulic cylinders 182 are operated to compress the respective springs 183 against the outside annular flange 16 of the bushing 15, thereby causing the preloading pressure at the bushing 15 to be relatively increased. This stage is the medium preloading stage. When increasing the preloading pressure to the highest range, the first miniature hydraulic cylinders 181 and the second miniature hydraulic cylinders 182 are operated to compress the respective springs 183 against the outside annular flange 16 of the bushing 15, thereby causing the preloading pressure at the bushing 15 to be relatively increased. This stage is the high preloading stage.

As indicated above, the preloading bearing unit of the present invention achieves the following advantages:

1. The preloading bearing unit can be adjusted to provide three different pressures alternatively, namely, the low preloading pressure, the medium preloading pressure, and the high preloading pressure.
2. The desired preloading pressure is achieved simply by switching on/off the first miniature hydraulic cylinders and the second miniature hydraulic cylinders without the need of controlling the pressure of the hydraulic fluid.
3. Because multiple miniature hydraulic cylinders are provided, no sticking problem will occur during the operation of the preloading bearing unit, and the assembly process of the preloading bearing unit is easy, and manufacturing cost of the preloading bearing unit is low.

While only one embodiment of the present invention has been shown and described, it will be understood that various modifications and changes could be made thereunto without departing from the spirit and scope of the invention disclosed.

What the invention claimed is:

1. A preloading bearing unit mounted within a casing to support an antifriction bearing and the motor shaft of a motor in said antifriction bearing inside said casing, comprising a bushing mounted within said casing around said antifriction bearing, and a hydraulic cylinder assembly controlled to displace said bushing axially on said antifriction bearing, said hydraulic cylinder assembly comprising a plurality of first miniature hydraulic cylinders and second miniature hydraulic cylinders arranged around said bushing, said first and second miniature hydraulic cylinders each having a rear end mounted with a spring respectively stopped at a part of said bushing to push said bushing axially in one direction, a set of first hydraulic fluid delivery pipes and a set of second hydraulic fluid delivery pipes connected to said first and second miniature hydraulic cylinders, a first annular hydraulic fluid accumulation chamber communicated with said first hydraulic fluid delivery pipes for guiding a hydraulic fluid to said first miniature hydraulic cylinders, and a second annular hydraulic fluid accumulation chamber communicated with said second hydraulic delivery pipes for guiding a hydraulic fluid to said second miniature hydraulic cylinders.

2. The preloading bearing unit of claim 1 wherein said first miniature hydraulic cylinders and said second miniature hydraulic cylinders are alternatively arranged around said bushing.

3. The preloading bearing unit of claim 1 wherein said bushing comprises an outside annular flange raised around an outside wall thereof at one end and stopped against the spring at each of said first and second miniature hydraulic cylinders, and an inside annular flange raised around an inside wall thereof at an opposite end and disposed in contact with said antifriction bearing.

4. The preloading bearing unit of claim 1 wherein said first miniature hydraulic cylinders and said second miniature hydraulic cylinders are respectively connected to said first hydraulic fluid delivery pipes and said second hydraulic fluid delivery pipes one to one.

5. The preloading bearing unit of claim 1 wherein said first annular hydraulic fluid accumulation chamber and said second annular hydraulic fluid accumulation chamber have a respective intake pipe for receiving a hydraulic fluid separately.

6. The preloading bearing unit of claim 1 wherein said bushing is a ball bushing.

7. The preloading bearing unit of claim 1 wherein said bushing is a hydraulic bushing.

\* \* \* \* \*